United States Patent
Fitzmaurice et al.

(10) Patent No.: US 7,895,536 B2
(45) Date of Patent: Feb. 22, 2011

(54) LAYER EDITOR SYSTEM FOR A PEN-BASED COMPUTER

(75) Inventors: George Fitzmaurice, Toronto (CA); Gordon Kurtenbach, Toronto, CA (US); Lynn Miller, Toronto (CA); Joe Di Vittorio, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 659 days.

(21) Appl. No.: 10/748,685

(22) Filed: Dec. 31, 2003

(65) Prior Publication Data

US 2004/0217947 A1    Nov. 4, 2004

Related U.S. Application Data

(60) Provisional application No. 60/438,499, filed on Jan. 8, 2003.

(51) Int. Cl.
*G06F 3/048* (2006.01)
(52) U.S. Cl. ...................................... 715/860
(58) Field of Classification Search .................. 715/863, 715/864, 860
See application file for complete search history.

(56) References Cited

U.S. PATENT DOCUMENTS

| | | | |
|---|---|---|---|
| 5,689,667 A | | 11/1997 | Kurtenbach |
| 5,808,610 A | * | 9/1998 | Benson et al. ............... 715/788 |
| 5,809,498 A | * | 9/1998 | Lopresti et al. ................ 707/6 |
| 5,821,926 A | * | 10/1998 | Arita .......................... 715/744 |
| 5,926,178 A | * | 7/1999 | Kurtenbach ................. 715/834 |
| 5,933,143 A | * | 8/1999 | Kobayashi ................... 715/805 |
| 6,005,549 A | * | 12/1999 | Forest .......................... 345/157 |
| 6,031,529 A | * | 2/2000 | Migos et al. ................. 715/783 |
| 6,094,197 A | * | 7/2000 | Buxton et al. ............... 715/863 |
| 6,281,420 B1 | | 8/2001 | Suzuki et al. |
| 6,317,142 B1 | * | 11/2001 | Decoste et al. .............. 715/762 |
| 6,606,105 B1 | * | 8/2003 | Quartetti ...................... 715/853 |
| 6,760,049 B1 | * | 7/2004 | Todd ........................... 715/813 |
| 6,819,990 B2 | * | 11/2004 | Ichinose ....................... 701/36 |
| 6,883,143 B2 | | 4/2005 | Driskell |
| 6,918,091 B2 | | 7/2005 | Leavitt et al. |
| 7,062,497 B2 | * | 6/2006 | Hamburg et al. ............ 707/101 |
| 2002/0054175 A1 | | 5/2002 | Miettinen et al. |

(Continued)

OTHER PUBLICATIONS

Screen Dumps of Macromedia Flash MX (Mar. 14, 2002, pp. 1-7).*

(Continued)

*Primary Examiner*—Dennis-Doon Chow
*Assistant Examiner*—Le Nguyen
(74) *Attorney, Agent, or Firm*—Staas & Halsey LLP

(57) ABSTRACT

The present invention is a system that provides a layer editor representing layers using box like controls. The layer controls are arranged in vertical stack representing the ordering of the layers in the paint application and provided with a highlight frame that indicates an active layer. The name or graphic of each layer depicted in the corresponding box for that layer can be created using drawing strokes of a stylus or pen of a pen-based computer. The pen is also used to select the controls, pop-up menus and perform selections or operations with underlying menus and/or functions. Making a mark with the pen can be used to select layer editing functions. A drawing dialog is used to write or draw the names applied to the layers.

10 Claims, 21 Drawing Sheets

U.S. PATENT DOCUMENTS

| | | | |
|---|---|---|---|
| 2002/0097277 | A1 | 7/2002 | Pitroda |
| 2002/0122072 | A1 | 9/2002 | Selker |
| 2002/0122158 | A1 | 9/2002 | Miyashita et al. |
| 2002/0171690 | A1* | 11/2002 | Fox et al. .................... 345/862 |
| 2004/0093565 | A1* | 5/2004 | Bernstein et al. ............ 715/531 |
| 2004/0119763 | A1* | 6/2004 | Mizobuchi et al. .......... 345/863 |
| 2004/0125153 | A1* | 7/2004 | Tosey ......................... 345/863 |
| 2004/0189724 | A1 | 9/2004 | Golibrodski et al. |
| 2006/0136840 | A1 | 6/2006 | Keely et al. |

OTHER PUBLICATIONS

Kurtenbach, G. and Buxton, W. 1993. The limits of expert performance using hierarchic marking menus. In Proceedings of the SIGCHI Conference on Human Factors in Computing Systems (Amsterdam, The Netherlands, Apr. 24-29, 1993). CHI '93. ACM Press, New York, NY, 482-487. DOI=http://doi.acm.org/10.1145/169059.169426.

Kurtenbach, G. and Buxton, W. 1994. User learning and performance with marking menus. In Conference Companion on Human Factors in Computing Systems (Boston, Massachusetts, United States, Apr. 24-28, 1994). C. Plaisant, Ed. CHI '94. ACM Press, New York, NY, 218. DOI=http://doi.acm.org/10.1145/2599963.260376.

The International Searching Authority issued a "Notification of Transmittal of the International Search Report and the Written Opinion of the International Searching Authority" on May 5, 2008 related to International Application No. PCT/US04/00162.

* cited by examiner

LAYER EDITOR SYSTEM FOR A PEN-BASED COMPUTER

CROSS-REFERENCE TO RELATED APPLICATION(S)

This application is related to and claims priority to U.S. provisional application entitled "User Interface Techniques For Pen-Based Computers" having Ser. No. 60/438,499, by Fitzmaurice et al, filed Jan. 8, 2003; this application is related to U.S. application entitled "A User Interface Having A Placement And Layout Suitable For Pen-Based Computers" having Ser. No. 10/748,686, by Fitzmaurice et al, filed Dec. 31, 2003; and this application is related to U.S. application entitled "Biomechanical User Interface Elements For Pen-Based Computers" having Ser. No. 10/748,684, by Fitzmaurice et al, filed Dec. 31, 2003; and all of which are incorporated by reference herein.

BACKGROUND OF THE INVENTION

1. Field of the Invention

The present invention is directed to a layer editor for a pen-based computer and, more particularly, to system where user identification of layers does not require text input, commands can be applied to the layers using a marking menu approach and where the invocation of the marking menus is facilitated by large "hit areas" for the menus in the layer editor.

2. Description of the Related Art

Pen or stylus based computers, such as tablet personal computers (PCs) and personal digital assistants (PDAs) are becoming popular. These computers typically allow the user to interact with the computer through a graphical user interface using a stylus or pen (or possibly even a finger). A keyboard and a mouse are typically not available. Pen-based type interaction can be limiting as compared to other types of interaction, such as using the mouse or the keyboard, alone or in combination. What is needed are improvements to the interaction capability of pen-based computers.

User interfaces—UI (layer editors) providing access to the layer functionality of paint systems are designed for mouse based user interfaces. Layer editors provide a representation of each paint layer that can be manipulated or edited. Typical examples are the layer editor in PhotoShop or the layer editor in "Fractal paint". These types of UI present difficulties when operated on pen-based computers. Specifically, the naming of layers in a traditional UI requires text input and this is hard to do with a pen. Also, buttons and widgets on a traditional UI can be too small to accurately hit with a pen. What is needed is a system that will allow writing based naming of layers and controls that can be more easily targeted with a pen or stylus.

In addition, most keyboard and mouse based user layer editor interfaces use hot-keys to allow a user to quickly access layer commands that are normally in menu-items on the menu bar or on pop-up menus. With a pen based user interface no keyboard may be available or the user may prefer not to use the keyboard. What is needed is to provide pen-based computers fast access capability somewhat equivalent to hot key capability.

SUMMARY OF THE INVENTION

It is an aspect of the present invention to provide a layer editor where user identification of layers does not require text input.

It is another aspect of the present invention to allow commands to be applied to the layers using marking menu technology.

It is an additional aspect of the present invention to provide large hit areas or zones for the controls of the layers.

The above aspects can be attained by a system that provides a layer editor representing drawing layers using box like controls where the name of each layer depicted in the box for that layer can be created using writing strokes of a stylus or pen of a pen-based computer. The pen is also used to select the controls, pop-up menus and perform marking selections or operations with underlying menus or functions. A drawing dialog is used to write the names applied to the layers.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The present invention is directed to a layer editor system that enables users to avoid text input by drawing the names of layers by hand with the pen on the layers represented in the layer editor. The invention also provides larger hit zones or areas so button/control operation with a pen is easier. Command engagement is further facilitated by the use of marking menus on each layer representation to make command engagement very easy with a pen.

Figure 1:
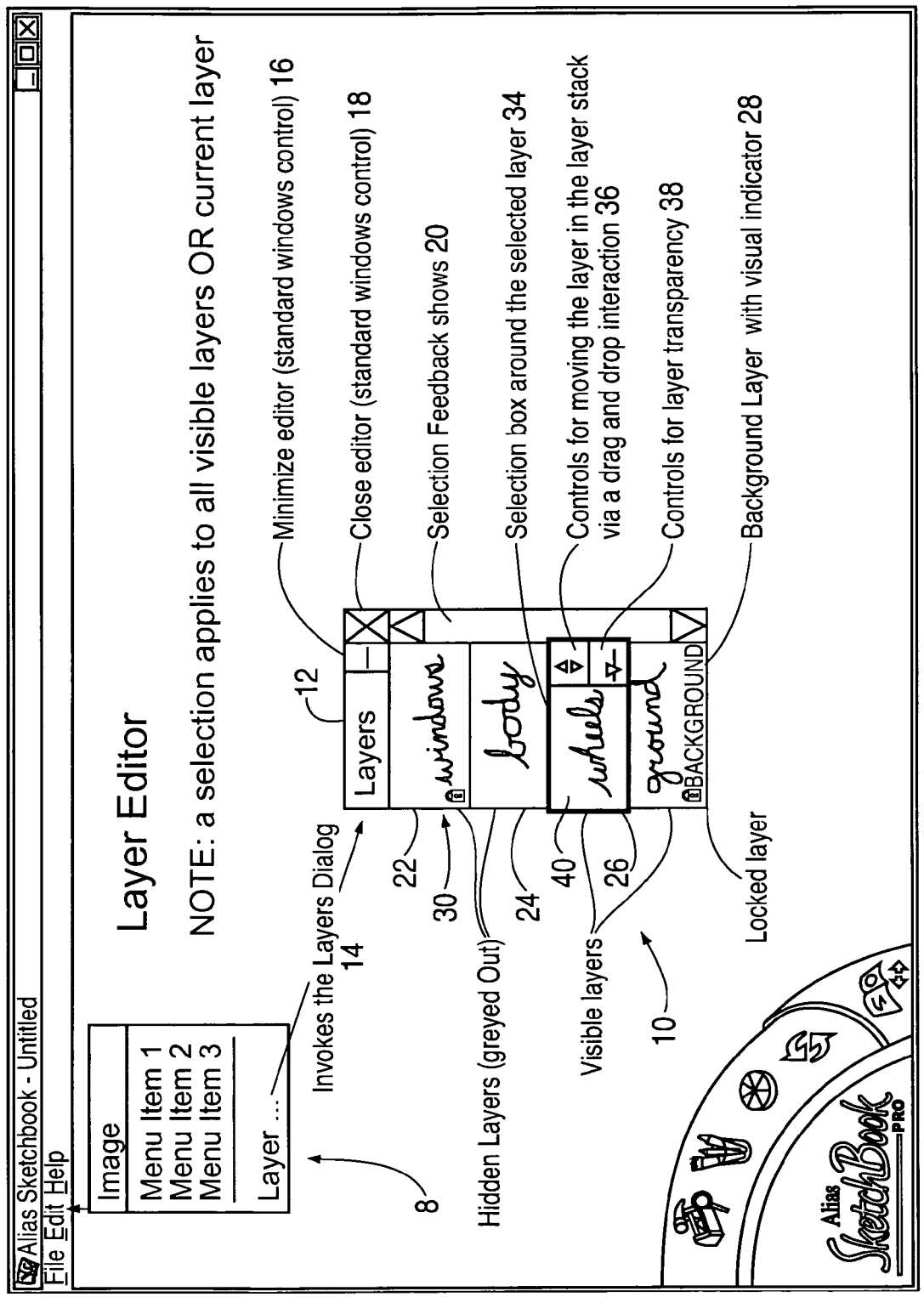
FIG. 1 illustrates a layer editor user interface (UI) of the present invention.

The layer editor 10 of the present invention, as depicted in FIG. 1, can be displayed on the display screen of a pen-based or other type of computer using any common method of command invocation. Typically this is done from a "Layers Editor" menu-item in the menu bar. FIG. 1 shows an example where the layers editor 10 is displayed by selecting, for example, Edit->Layers in the menu-bar or pop-up menu 8. Invoking the layer editor 10 can be done in many different ways, such as with a special button on the screen, or by pressing a key on the keyboard.

The layer editor 10 is a graphical user interface that preferably includes a box like graphic 12 that encloses the different controls, etc. of the editor 10. To make the layer editor 10 easier to use with a pen or stylus, the controls in the layer editor 10 should be relatively large or present relatively large targets for the pen user to hit. Large controls, in the context of a pen or stylus, relate to the accuracy of the pointing device. Typically, pointing with a pen moves the cursor to that location +/−e, where e is the distance "error accuracy of the pen". Preferably, a target has to be at least 2e in size to assure that if the user does point to the center of the target the cursor will be within the target. With current tablet pc pens or styli e is about 1-2 mm, so targets are preferably at least 4 mm high and wide. This of course is an extreme minimum: 10 mm is much more acceptable and preferable. In addition, "Fitts Law" of pointing indicates that the ease of pointing is proportional to the width of the target, so bigger is generally better. As a result, we prefer that a layer editor button or control have a target size of about 20 mm (10e) for minimum height and width.

When the layer editor 10 is displayed it preferably has many of the common window features typically found in modern graphical user interfaces. These features include a title bar 14 that allows a user to invoke a layers dialog. A minimize button or control 16 that allows the editor 10 to be minimized. A close button 18 closes the editor 10. A scrollbar 20 allows the different layers depicted by the editor 10 to be displayed where the typical editor displays five layers and can be scrolled to display all of the layers. These controls may be enlarged as needed to allow easier operation with a pen.

The present invention provides for the use of boxes displayed to represent the ordering of the drawing layers in a paint application. FIG. 1 shows a bottom to top ordering of four layers 22-28 where the background layer 28, hand letter named "ground", is at the bottom of the layer editor and subsequent layers are "layered on top over" each other. This vertical ordering represents the underlying ordering of the data structure, such as a pointer directed list implementing a layer stack, that maintains the layers for the particular drawing. The stack entries also contain the parameter data for each of the layers, such as locked/unlocked status, hidden/visible status, layer name bitmap, active, etc. Each layer can be a control that allows a function to be performed, such as display the layer in a one-shot type function or display a menu of operations that can be performed on the layer in a menu access type multiple operation type function. Each layer box displays its name and some state information about the layer (a layer may be hidden or visible, selected or unselected, locked, etc.). For example, layer 24 is the named the "body" layer and is a hidden layer indicated by using a gray overlay to indicate the hidden status. Layer 22 is named the "windows" layer and is also a hidden layer, but it is locked as depicted by the lock icon 30. This icon 30 is typically not a control because it is a very small target; however, the icon 30 could be a control providing a toggle between locked and unlocked. A locked layer cannot be moved. The background layer 28 is a visible layer, as indicated by the transparent overlay indicator and is also locked. The background layer 28 also preferably has a visual indicator 32, in this case the text "BACKGROUND", indicating that the layer is the background layer. Layer 26 is named the "wheels" layer. Layer 26 is a visible layer. Layer 26 is shown as having been selected by the user by the selection indication frame graphic 34 that has been placed around the layer box 26, thereby highlighting box 26. When a layer is selected, controls specifically for that layer are also presentable. FIG. 1 shows a layer move control 36 that allows the layer to be moved up or down in the editor layer stack. A transparency control 38 for the layer allows the user to set the transparency degree for the layer, in this case layer 26. These controls 36 and 38 appear when the layer is selected.

As noted above, the status icon 30 is preferably not a control. A reason that it is preferred that the lock icon 30 not be a control is the desire to make the target area for the layer control large for easy targeting and activation with a stylus. As a result, the present invention makes the menu target areas large by overlapping status indicators (like the lock icon 30) with the menu target area. In the present invention rather than having the status change or a status related function be activated when the icon is clicked, independent of the function of menu target area (for example, clicking on the lock unlocks the layer), preferably, clicking on the status icon pop-ups the marking menu of the menu target area. In this way the menu target area includes the status areas and hence is larger and easier to hit.

A particular layer can be selected by tapping on it with the pen, which can result in a visual indication on the layer box, such as the highlight frame, that it is selected. This selection is conventionally performed by comparing the position of the cursor/pen to a map of the control hit zones for the editor 10 and detecting a selection and a corresponding control when the cursor is within a particular layer or control hit zone of the map. The layer box is divided into three zones, the hit zones for and coincident with controls 36 and 38 and zone 40 corresponding to and activating a pop-up marking type menu 50 (see FIG. 2 and the discussion below).

Figure 2:
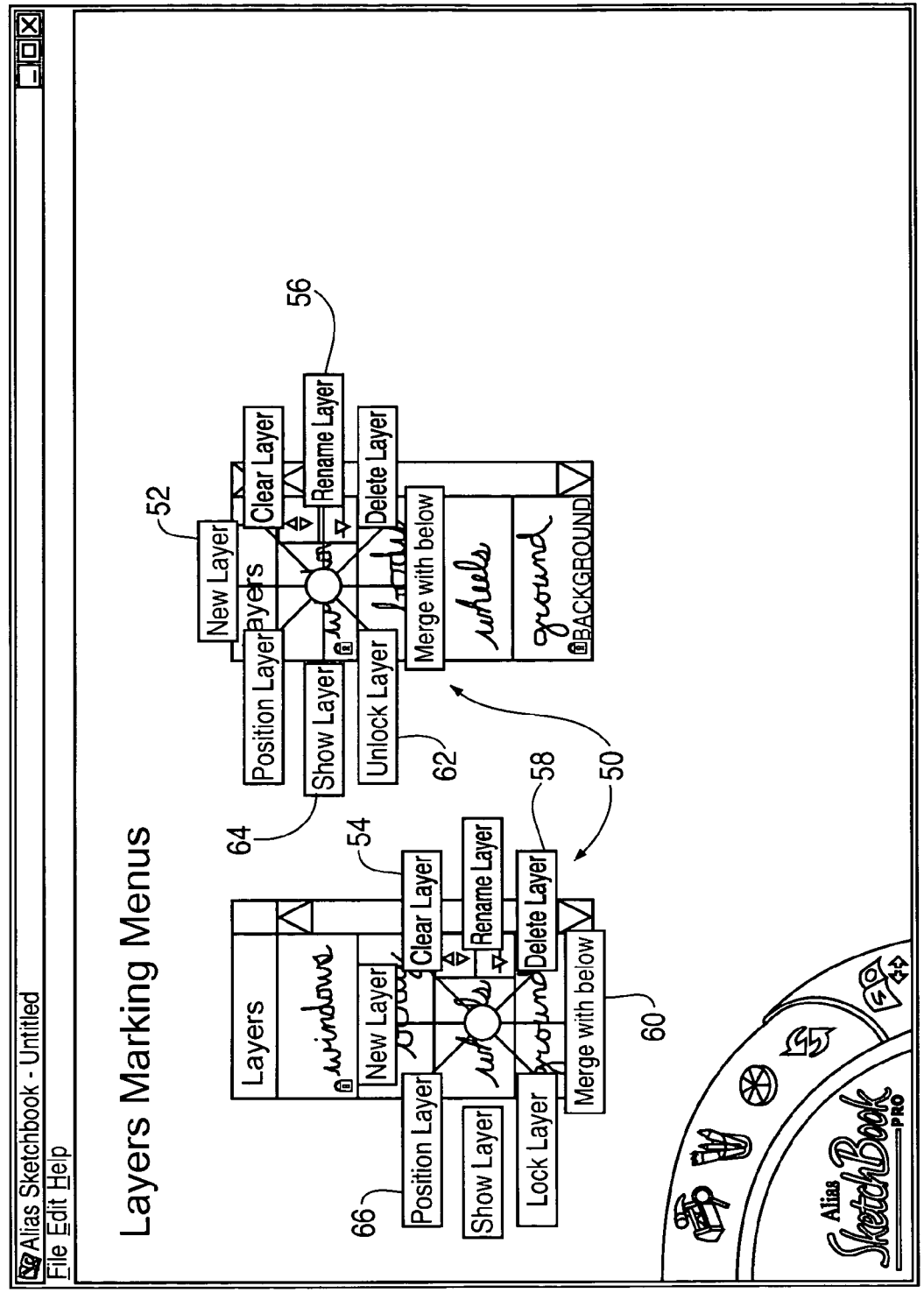
FIG. 2 depicts marking menus of the layer editor of the present invention.

To facilitate fast access to multiple functions for each layer, each layer box (or control) preferably has a pop-up menu 50 associated with it as shown in FIG. 2. To pop-up this menu 50, preferably the user has to press and hold the pen on a layer box and this pops-up a menu of commands that can be applied to the pressed on layer. Note that press and hold first selects the layer box so a user does not have to separately click to select the layer, then with the press and hold selection of a particular layer activated, the application or execution/initiation of a command can be done with a single drag action (a mark) through the desired item of the menu, which is a conventional marking menu type selection with the menu visible (or invisible as desired). As discussed above, an aspect of this invention is that the menus can be implemented as conventional "marking menus" where activation of one of the controls via a mark simultaneously selects a corresponding layer and selects an operation on the layer. Other types of pop-up menus could be used, such a traditional linear menus or "pie menus", however, marking menus are particularly suited to pen-based applications because a selection can be made very quickly by a simple straight stroke with the pen in the direction of the desired menu item.

FIG. 2 also depicts a preferred pop-up, drag operation selection menu 50 open over two layer editors. Each of the menus 50 is popped up for the active layer selected by the user. This menu has radial menu selections including a new layer selection 52 that inserts a new layer above or preferably below the selected or active layer. A clear layer control 54 that conventionally causes the system to clear the contents of the active layer. A rename layer selection 56 that allows the user to rename the layer using gestures or strokes of the pen/stylus to write the new name into the layer box, as will be discussed in more detail later. A delete layer menu button 58 conventionally deletes the current active layer by removing it from the stack when activated and the layer immediately below the deleted layer becomes the active layer. The merge control 60 causes the system to conventionally combine or compose the active layer with the layer below the active layer so that the content of the layers are combined. A lock layer selection 62 allows the user specify that the system lock/unlock the active layer. A hide layer selection 64 causes the active layer to be converted by the system to/from being a hidden layer when activated. The position layer control 66 puts the system into a mode in which the dragging on the layer itself (i.e., the cursor turns into a "dragging hand icon" and the user can drag the cursor on the image) moves the currently selected layer in 2 dimensions relative to the rest of the image. Note this is different from changing the ordering of the layers using the layer move control 36. This position function is exited by selecting another tool, such as a pencil drawing tool.

Figure 3:
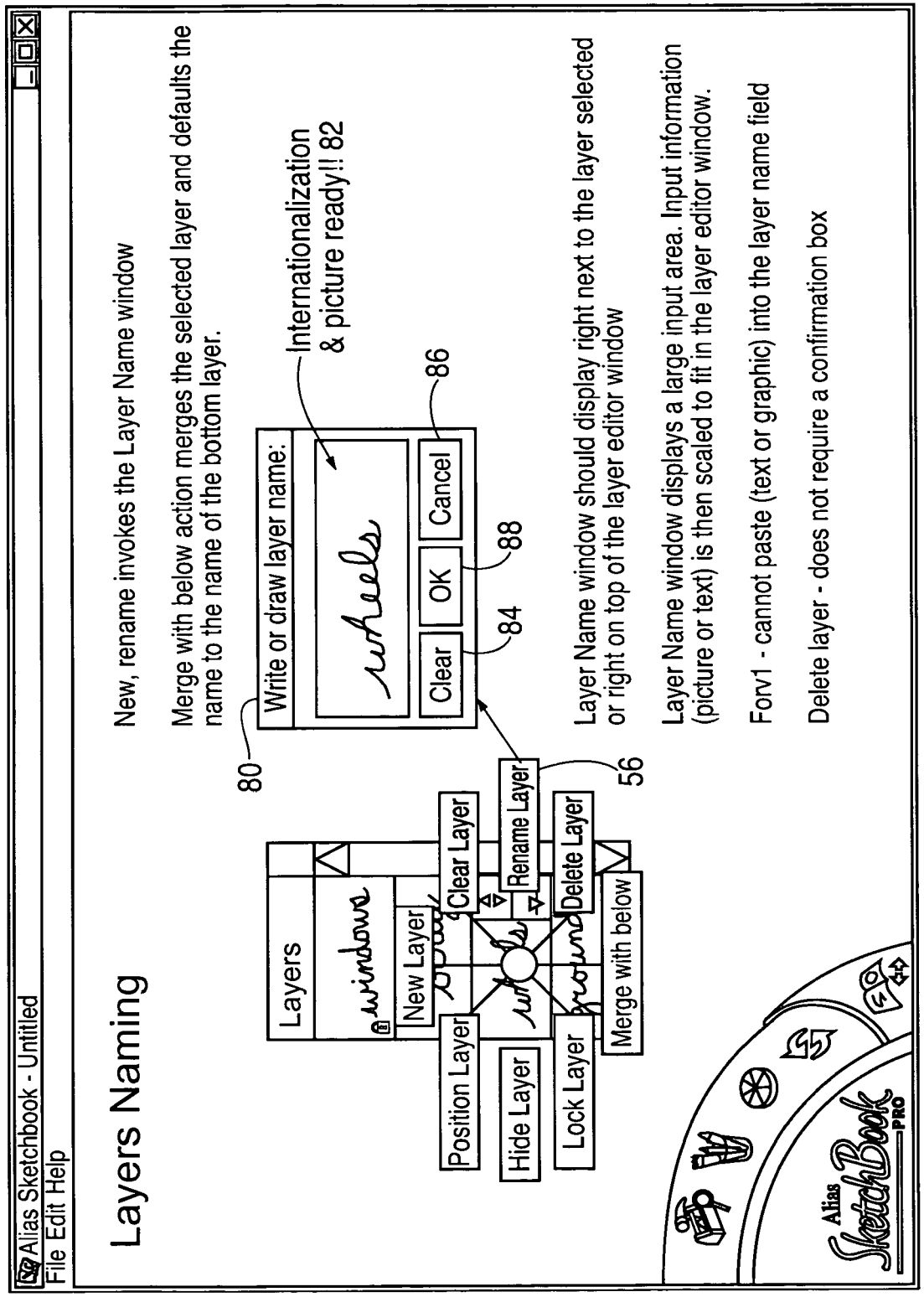
FIG. 3 depicts a drawing dialog box of the present invention used for naming the layers of the layer editor of the present invention.

Another feature of the invention is that the name contents of each layer box can be hand-drawn by the user. As shown in FIG. 3, when a user selects the "Rename Layer" menu item 56 of the marking menu 50, a conventional drawing dialog box 80 is displayed or pops-up. The dialog box 80 includes a drawing zone or area 82 where the user can simply draw any type of graphics to identify the layer. The dialog box 80 also includes controls or buttons for clear 84 that causes the system to clear the contents of the area 82, cancel 84 that causes the dialog box to be canceled by the system and OK 88. Pressing the OK control 88 causes the system to un-display the dialog box 80, store the hand drawn graphic of the drawing area contents in the layer editor data structure and place the hand drawn graphic into the corresponding layer box.

The drawing area 82 of the dialog box 80 can be conventionally configured to support all drawing operations such as different colors, pen brushes, and visual effects found in paint and draw programs. The user input to the drawing area does need to be hand-drawn only. A visual reduction of the corresponding actual drawing layer can conventionally be provided to identify the layer (supplied by the system or the user). Alternatively, any small image could be input or a large image input and conventionally reduced by the system to identify the layer. One variation of this embodiment is to use a special menu item on the marking menu, entitled "make thumbnail," to allow a user to create a layer box image by conventionally copying and reducing the image associated with a layer into the layer box. The image for the layer box can also be created by a "snapshot" style of interaction. For example, the "Rename Layer" dialog box 80 can have an addition button labeled "snapshot" that, when clicked, allows the user to select some portion of the screen to be used as the image for the layer box. The source of an image for a layer can even be a video or any dynamic visual element. The input to label a layer could also be in the form of "ink strokes" as specified by the Microsoft Tablet PC specification. This allows other types of commands, such as "typeface" or "bold", to be conventionally applied to the hand-drawn strokes. Speech recognition or character recognition for the drawn strokes could also be implemented to provide a textual string used to name the layer. Different types of input could be combined into the "Rename Label" dialog image. For example, the user may paste an image into the dialog box and then write on top of that image. Another variation of the "Rename Layer" functionality is to have the layer box be directly drawn into (meaning that the rename commands and dialog box would not needed). In a further variation embodiment, the hand drawn area of the layer box could also pop-up and be separated from the area that has a pop-up menu associated with it.

Figure 4:
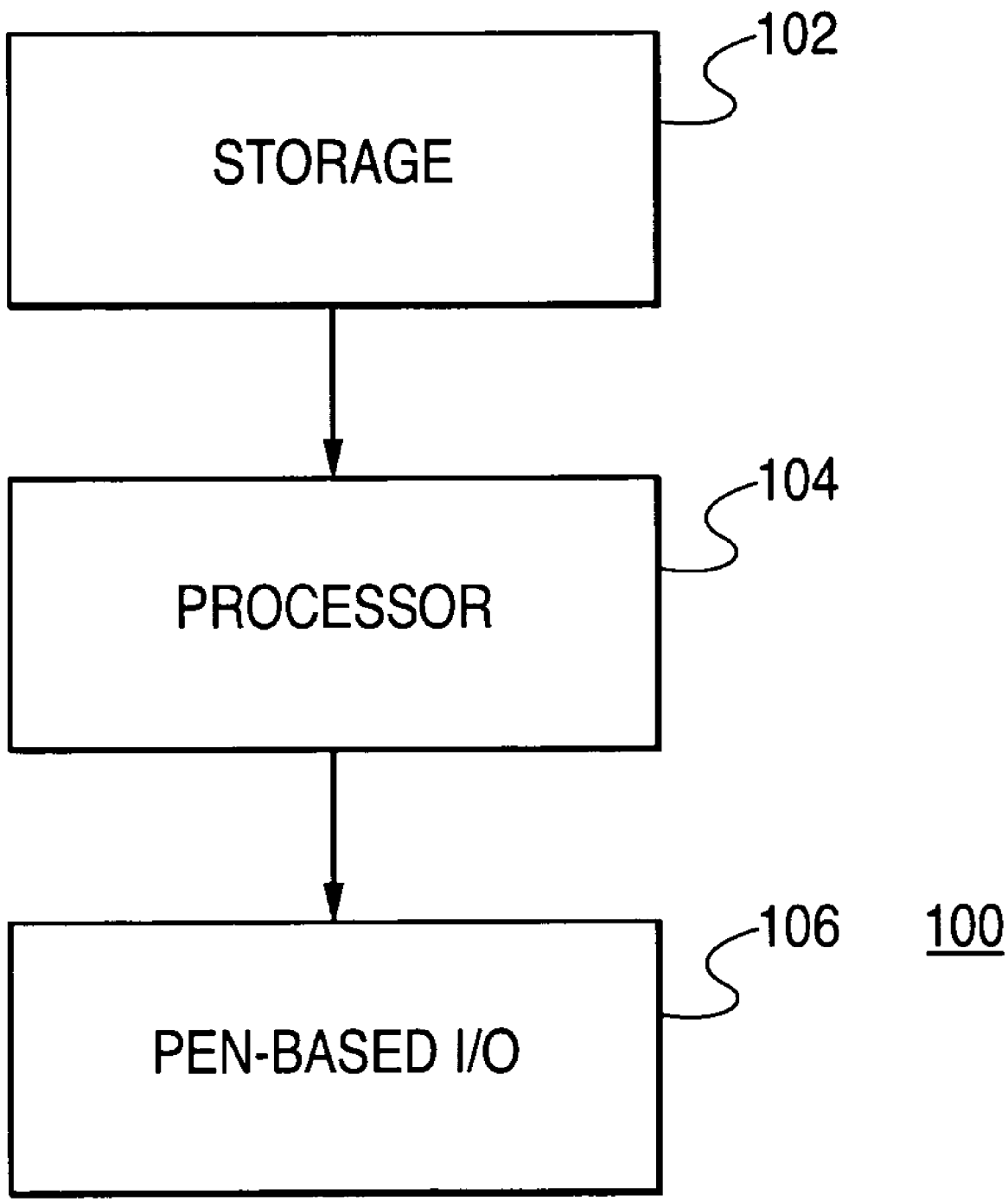
FIG. 4 depicts the hardware of the present invention.

The present invention preferably uses a hardware platform 100, as depicted in FIG. 4. This platform 100 includes a conventional storage 102 (RAM, ROM, hard disc, floppy disc, CD, DVD, etc.) for storing, paint programs, data structures, data, etc. used by the present invention as well as the processes, bitmap graphics and bitmap hit zones of the invention discussed herein. The platform 100 also includes a conventional processor 104, typically a tablet personal computer (Tablet PC) class machine. The platform 100 further includes a conventional pen based I/O system 106, such as a display with a pen based digitizer, and optionally includes conventional I/O components, such as a key board, floppy disc, mouse, etc.

Figure 5:
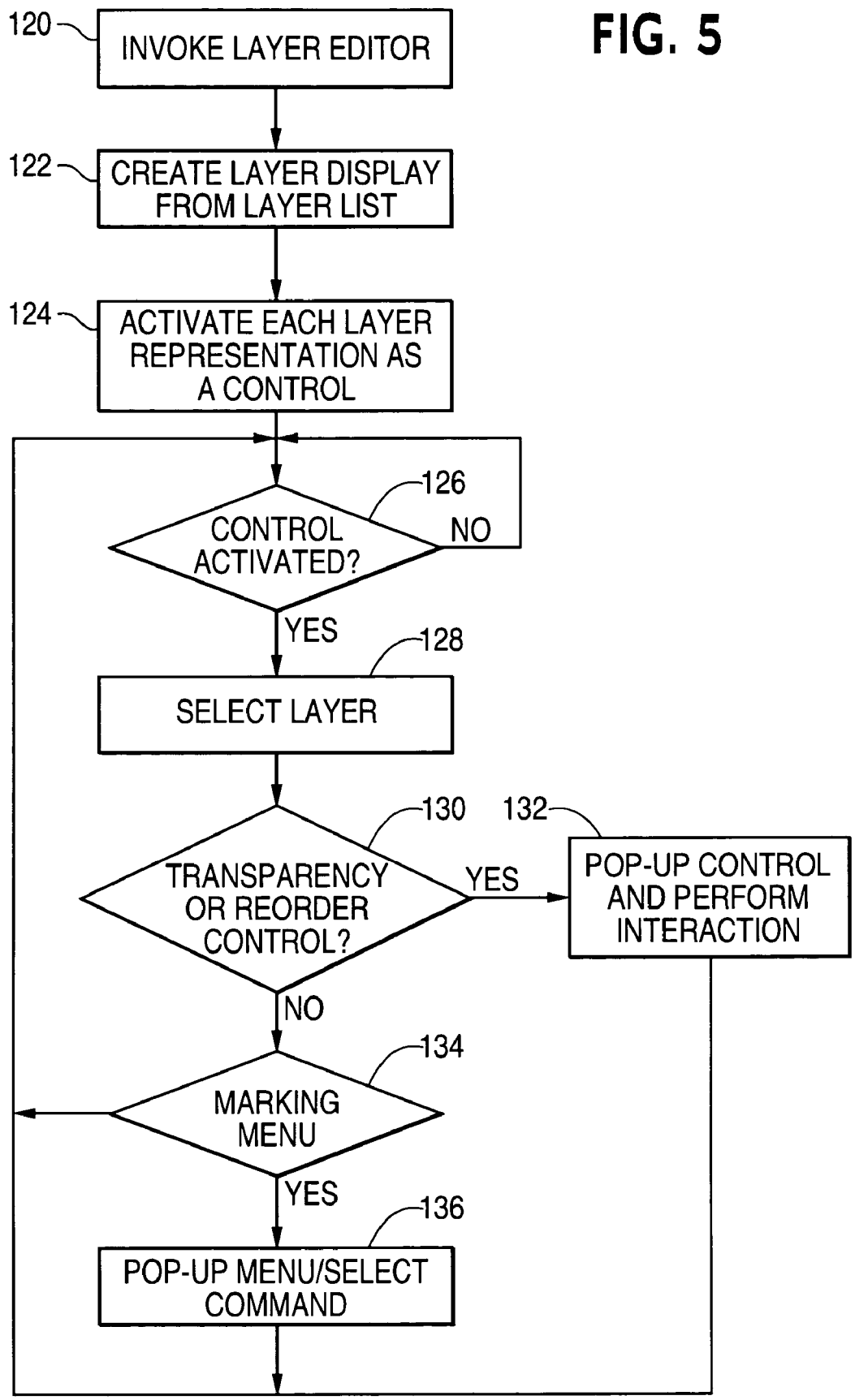
FIG. 5 shows the operations of the present invention.

The operations of the process for the pen based layer editor of the present invention are depicted in FIG. 5. When the layer editor is invoked 120, the system creates 122 a layer display from a list of the layers in the paint system. This involves determining the number of layers and producing a layer editor graphic with the number of boxes needed and applying it to the display at a desired or predetermined location, obtaining the graphics for the layer names from storage and applying them to the corresponding boxes, obtaining the graphic for the other controls such as the minimize button and applying them to the display at corresponding locations, determining whether a hidden layer overlay or locked icon needs to be applied, etc. Then each layer is activated 124 as the corresponding controls so that a user can "click-on" each layer or on the other buttons to perform an associated function or display an associated pop-up display. The system then waits 126 for one of the layer controls to be activated. If a layer box control has been activated as discussed above, the system selects 128 or activates the layer under the pen cursor and provides the box on the display for the activated layer with the frame visually indicating that the layer has been activated. The system them determines the type of control that has been activated. This includes determining 130 whether the control is the transparency control 38 or the reorder control 36. If one of these controls have been activated, the system pops up the appropriate control and performs the called for interaction 132. If theses controls are not selected, the system determines 134 whether the user is making a marking or radial menu type selection of items in the layer operation menu 50. If so, the menu is popped up and/or a selection is made and the system performs the selected function.

Figure 6:
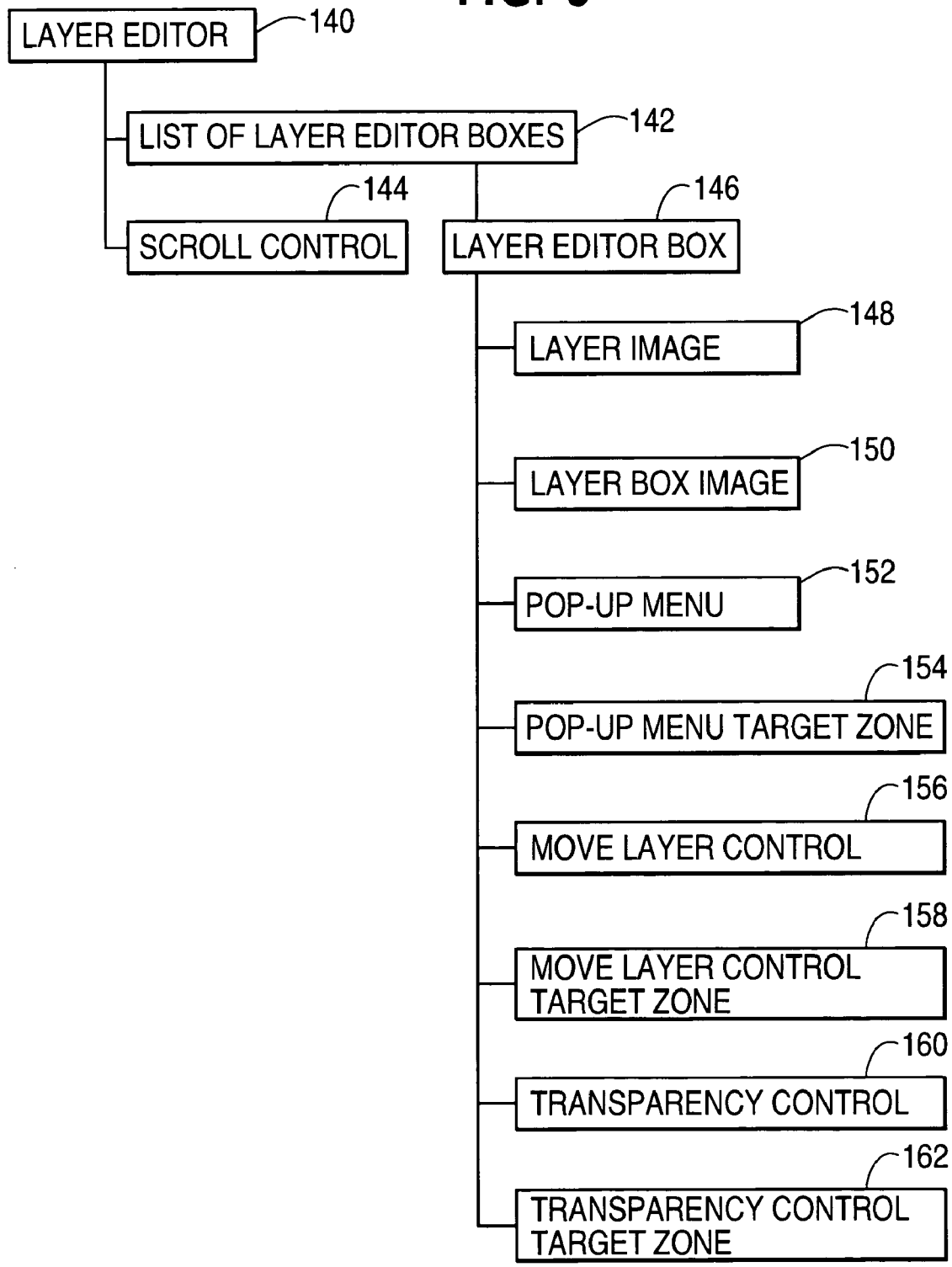
FIG. 6 illustrates the preferred data structure of the present invention.

The preferred data structure of the present invention is depicted in FIG. 6. As depicted linked data structure includes:

--- a Layer Editor 140 includes:
    a List of LayerEditorBoxes 142
    a Scroll Control 144
a LayEditorBox 146 includes:
    Layer Image 148
    Layer Box Image 150
    Popup-menu 152
    Popup menu target zone 154
    Move layer control 156
    Move layer control target zone 158
    Transparency control 160
    Transparency control target zone 162

---

Figure 7:
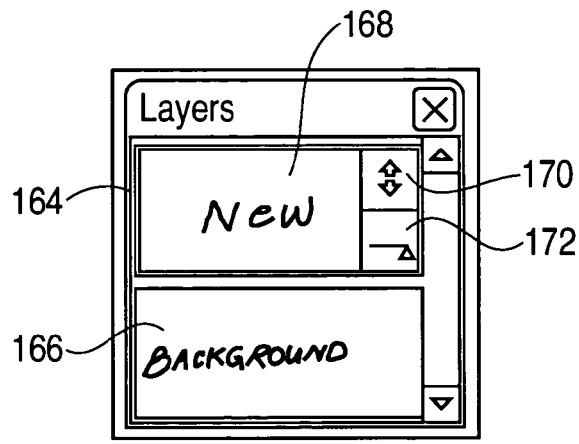
FIGS. 7-13 depict the components of the UI in more detail.
Figure 8:
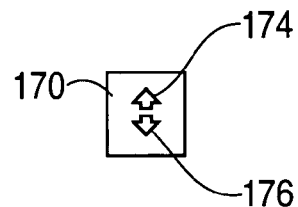
Figure 9:
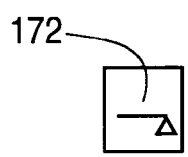
Figure 10:
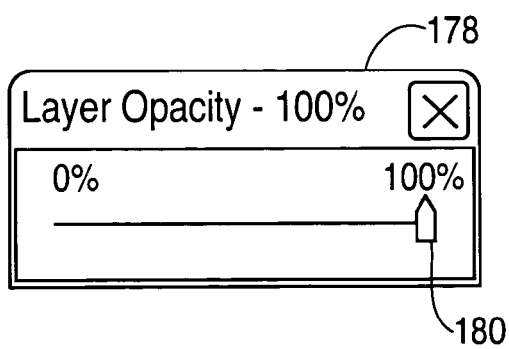
Figure 11:
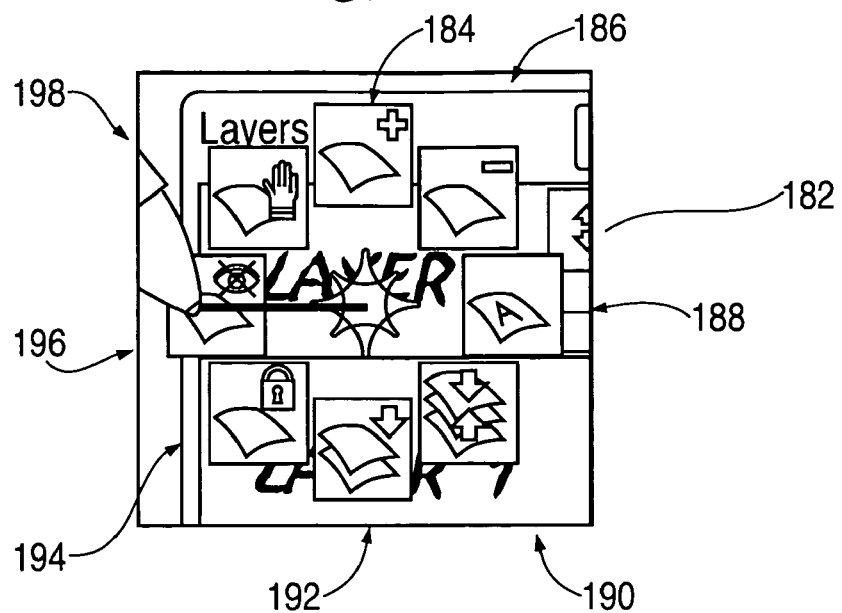
Figure 12:
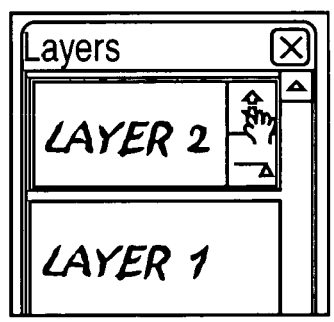
Figure 13:
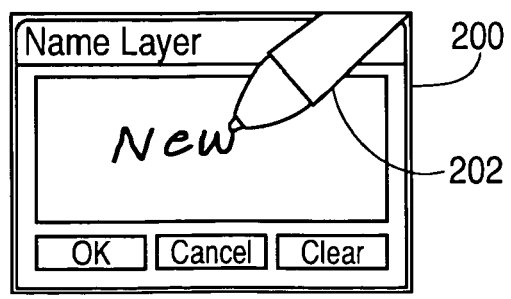

FIGS. 7-13 illustrate the controls of the layer editor 10 of the present invention in more detail. FIG. 7 depicts the layer editor 500 with two layers 164 and 166 "New" and "Background". In this example, New 166 is the active layer as indicated by the border. This layer has three control zones: marking menu commands 168; re-order layers 170; and layer opacity 172 controls. FIG. 8 shows the re-order layers transparent control visual 170 with both up 174 and down 176 controls for moving the active layer respectively within the layer stack. FIG. 9 depicts the layer opacity control 172 in more detail. Selecting control 172 brings up a dialog box 178 depicted in FIG. 10. The layer opacity dialog box 178 includes a slider 180 for setting the opacity of the layer from completely opaque to completely transparent. FIG. 11 illustrates the commands of the marking menu control 182 for each layer with the preferred icons. These layer marking menu commands (starting North and going clockwise)

include Add new layer icon/control 184 depicting a layer with a "+", Delete layer icon/control 186 depicting a layer with a "−", Rename layer icon/control 188 depicting a layer with lettering, Flatten image icon/control 190 depicting layers being pushed together by arrows, Merge with Below icon/control 192 depicting two layers and a merge arrow, Lock layer icon/control 194 depicting a layer and a lock, Hide/Show layer icon/control 196 depicting a layer with an eye, and Move layer icon/control 198 depicting a grab capable, open hand with a layer, the functions of the controls are discussed above with respect to FIG. 2. FIG. 12 depicts the reordering of the layer stack by a user selecting the transparent "re-order" graphic 170 on the active layer and dragging to the new position with the drag icon (closed grab hand) being depicted. FIG. 13 depicts the New Layer dialog box 200 in which the user can draw in a textual name or sketch a graphic using a pen or stylus and this will be the new image associated to the active layer.

Figure 14:
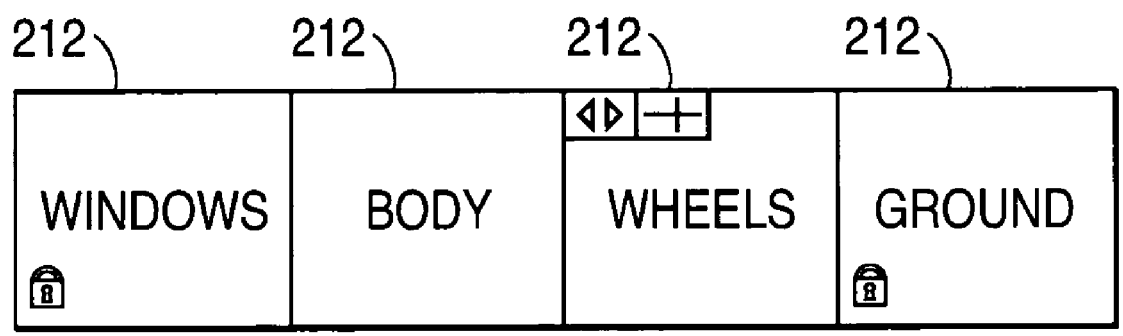
FIGS. 14-21 illustrate additional embodiments of the layer editor of the present invention.
Figure 15:
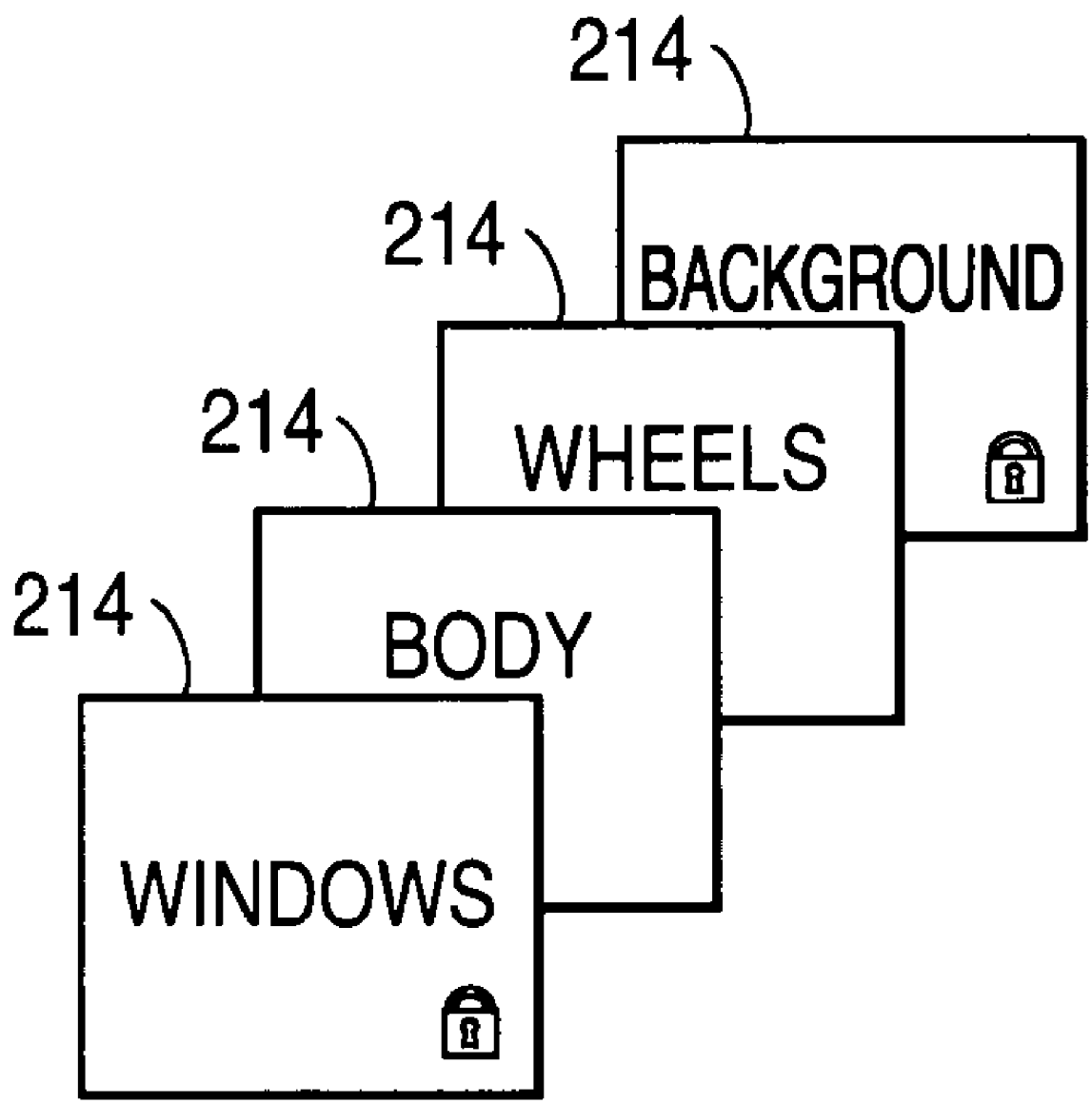
Figure 16:
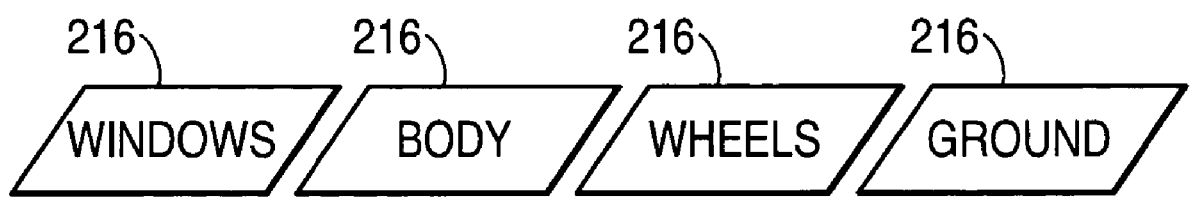
Figure 17:
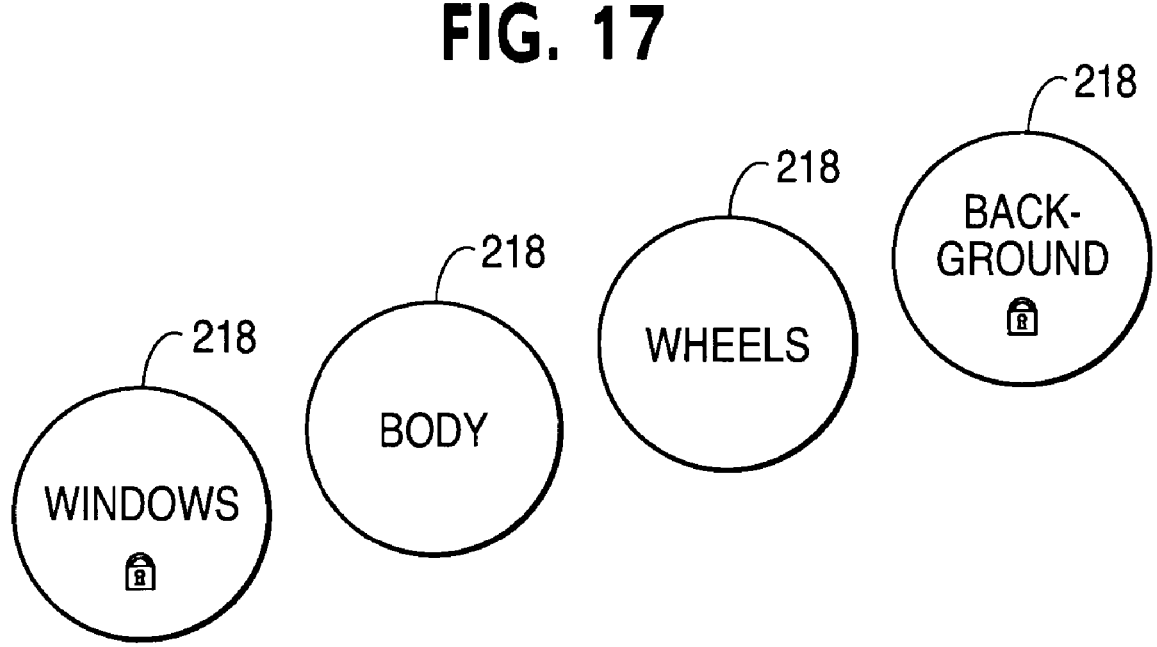
Figure 18:
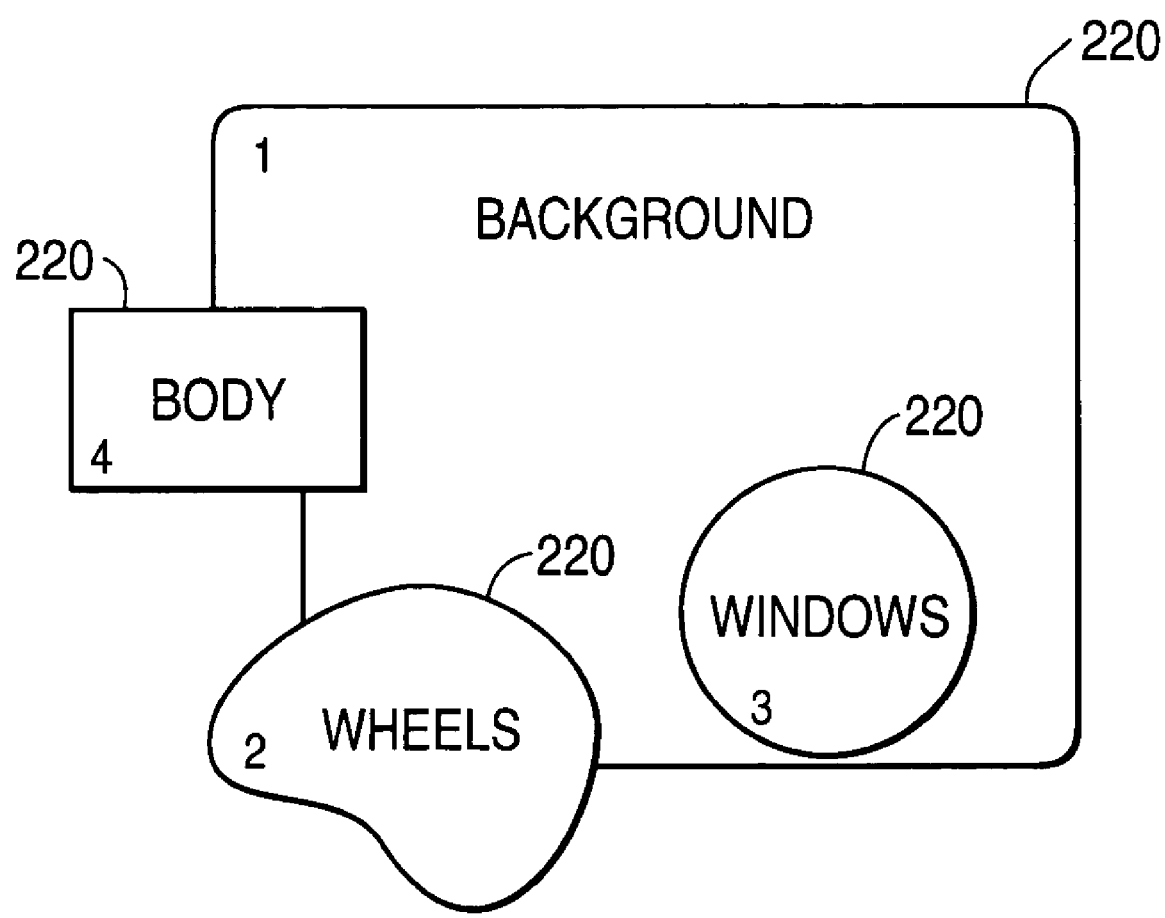
Figure 19:
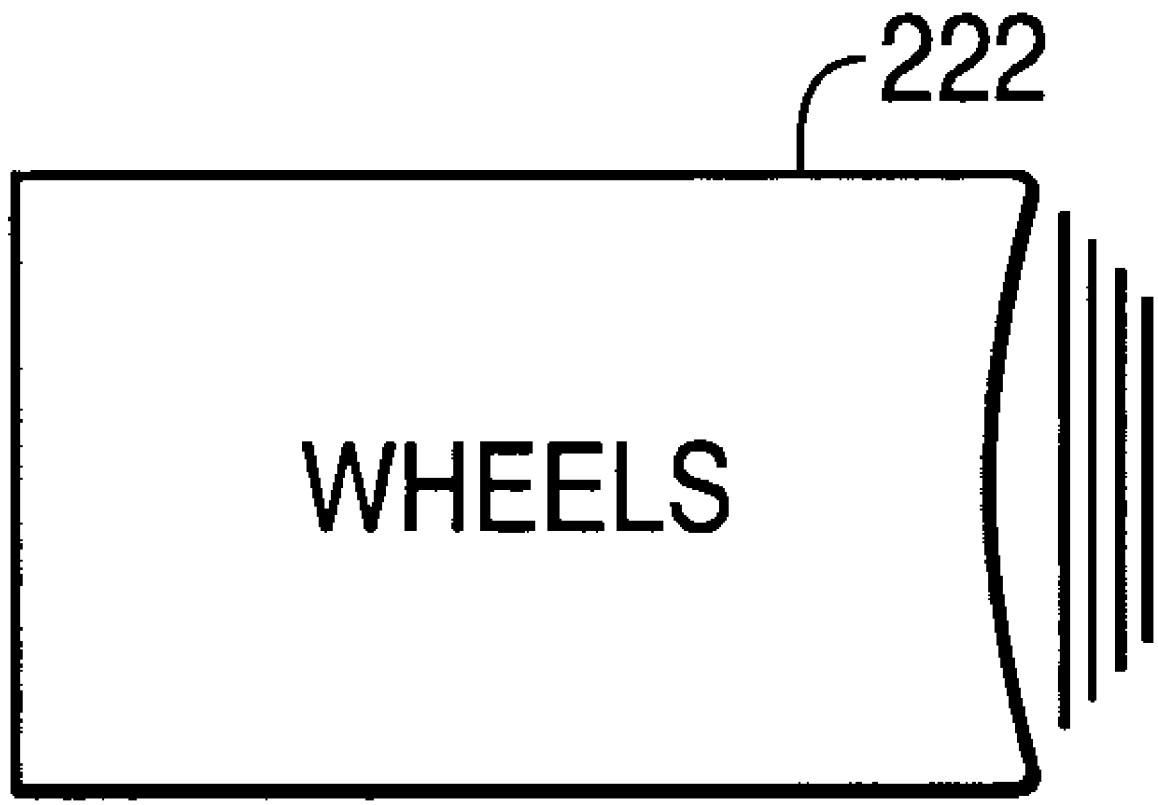
Figure 20:
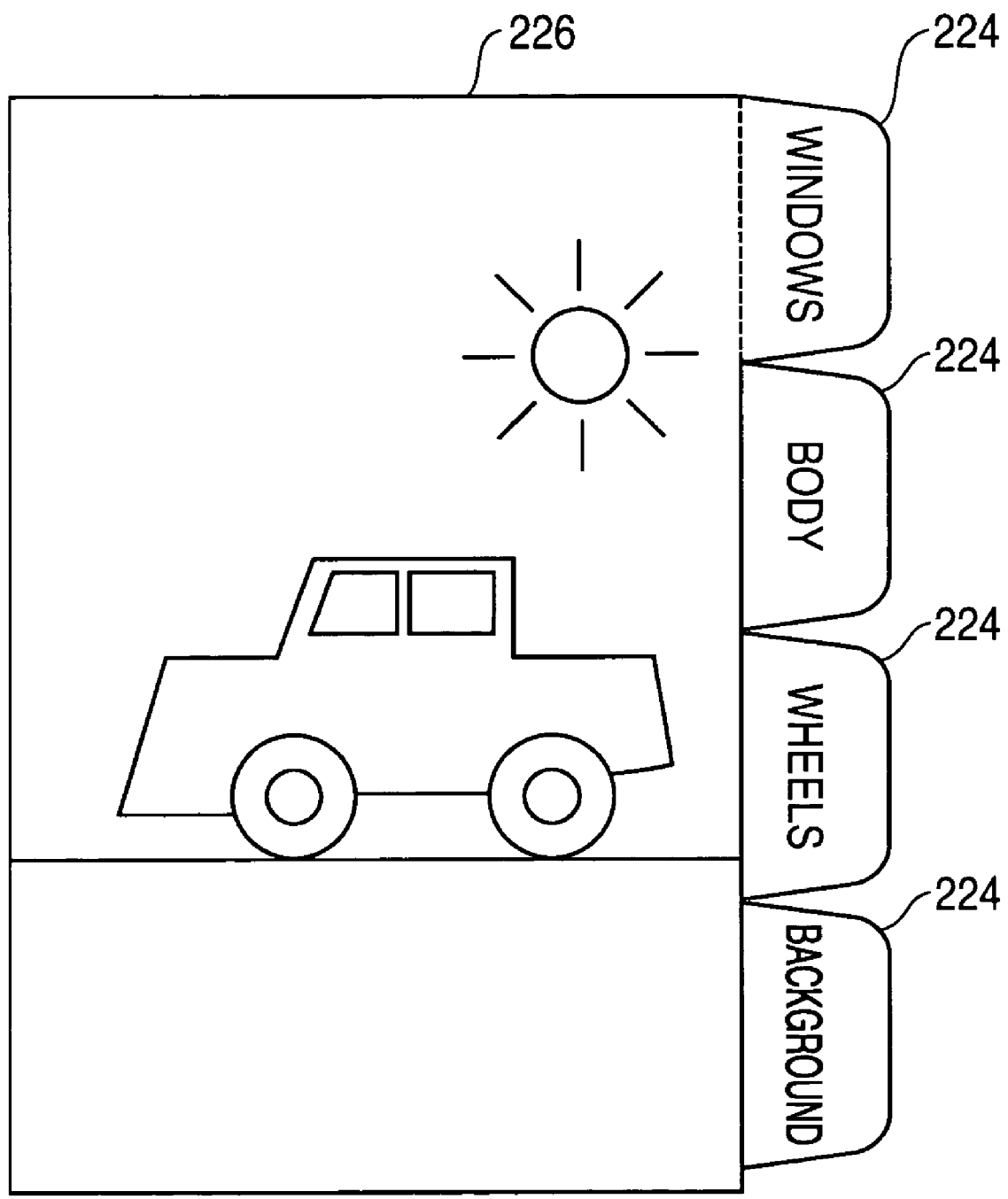

The layer editor interface as discussed above represents the layers as boxes arranged vertically. Other arrangements or embodiments are possible. FIG. 14 illustrates an arrangement of horizontal connected boxes 212. FIG. 15 depicts tiled overlapping boxes 214. FIG. 16 shows non-connected trapezoid type boxes 216. FIG. 17 illustrates an alternate embodiment of circular layer controls 218. FIG. 18 illustrates a mixed numerically labeled and overlapping display order of variously shaped layer representation controls 220. FIG. 19 depicts controls 222 with no spatial ordering where each box is displayed one at a time, possibly in order of time of creation. The layer editor controls can also be graphically "attached" to the display of the paint layers themselves as depicted in FIG. 20. FIG. 20 shows a list of tabs 224 along the display edge of the painted layered image 226 where the layer box (the tab in this case) is visually connected to the actual image.

Figure 21:
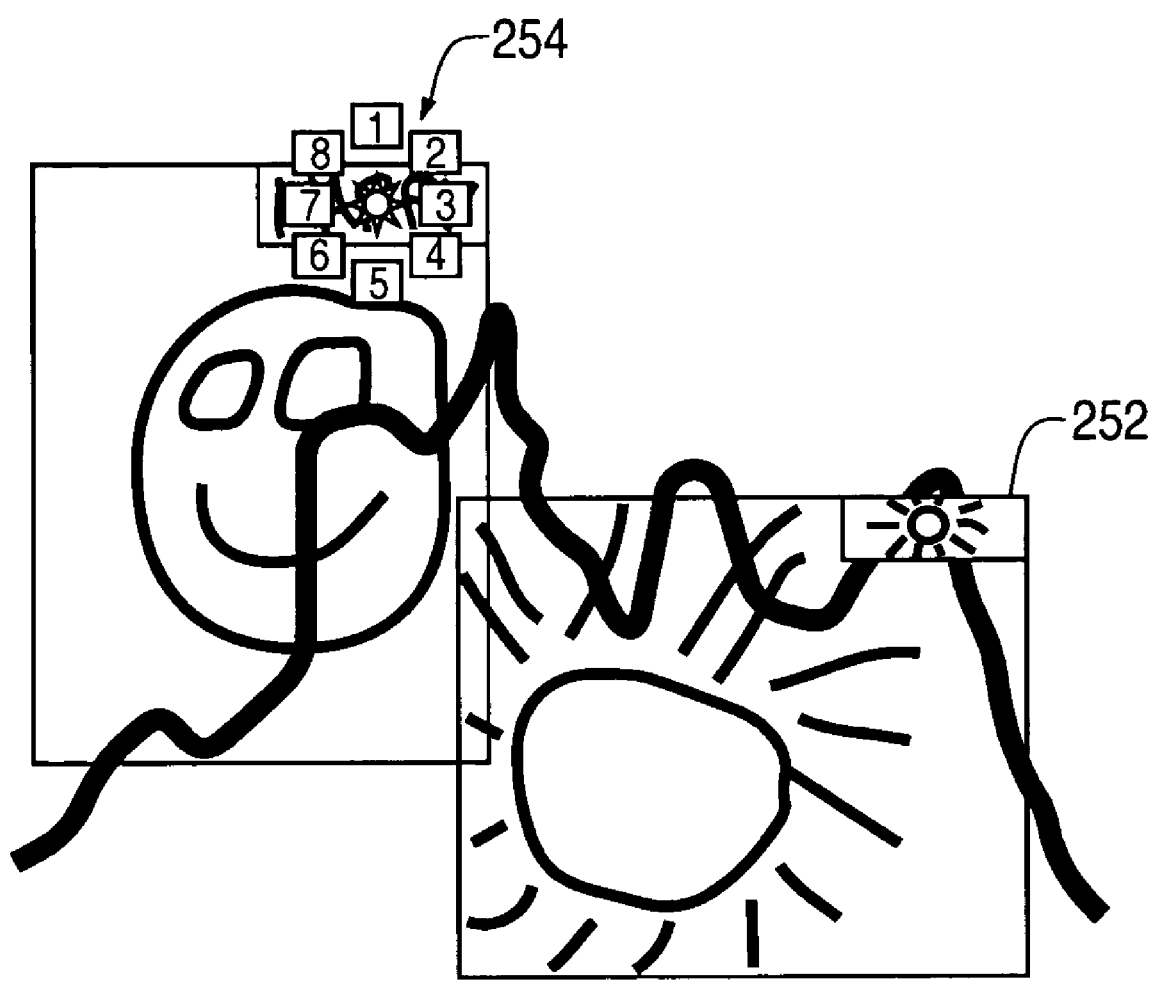
Figure 22:
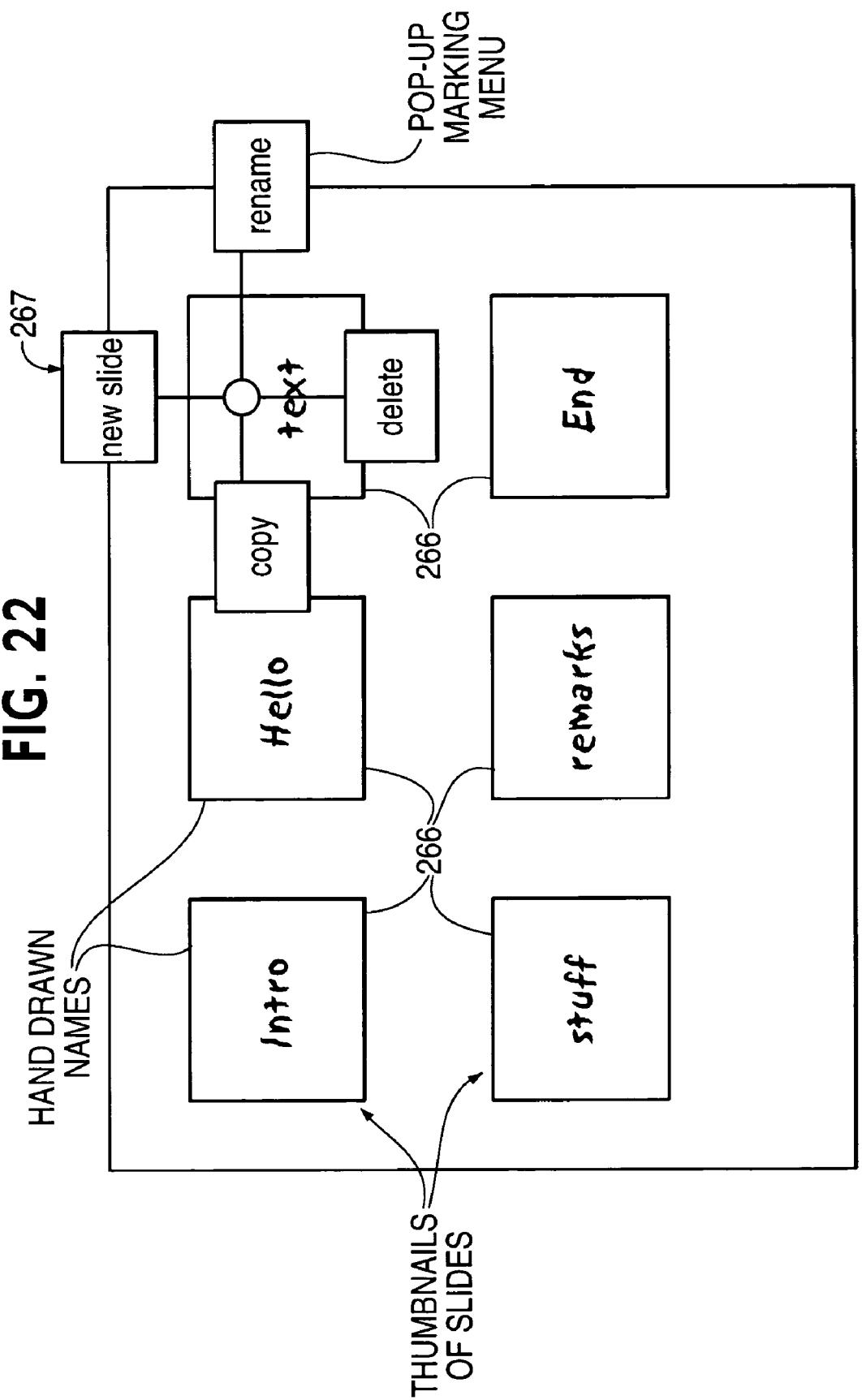
FIG. 22 illustrates using the present invention for a slide presentation editor.

Another embodiment, as depicted in FIG. 21 provides layer names 252 and pop-up menus 254 on the layers themselves. FIG. 22 is an image where three semi-transparent layers are placed over another image and on each layer a handwritten name or drawing is used. Each layer also has a spot where the pop up menu can be activated (the pop-up menu is shown with numbered menu items but these items could be typical layer commands such as: new layer, clear layer, rename layer etc.).

Ultimately any ordered list or array could be used. Furthermore this invention is applicable to other areas beyond layer editors. For example, the list or array could be the thumbnails for a set or presentation slides 266 which can be hand labeled by the user and controlled by marking menus (267) on each slide as depicted in FIG. 22. A 2d array of thumbnail images for a slide presentation could also be used. The slides are labeled by hand drawn graphics and a marking menu is used to apply commands to the slide boxes.

Figure 23:
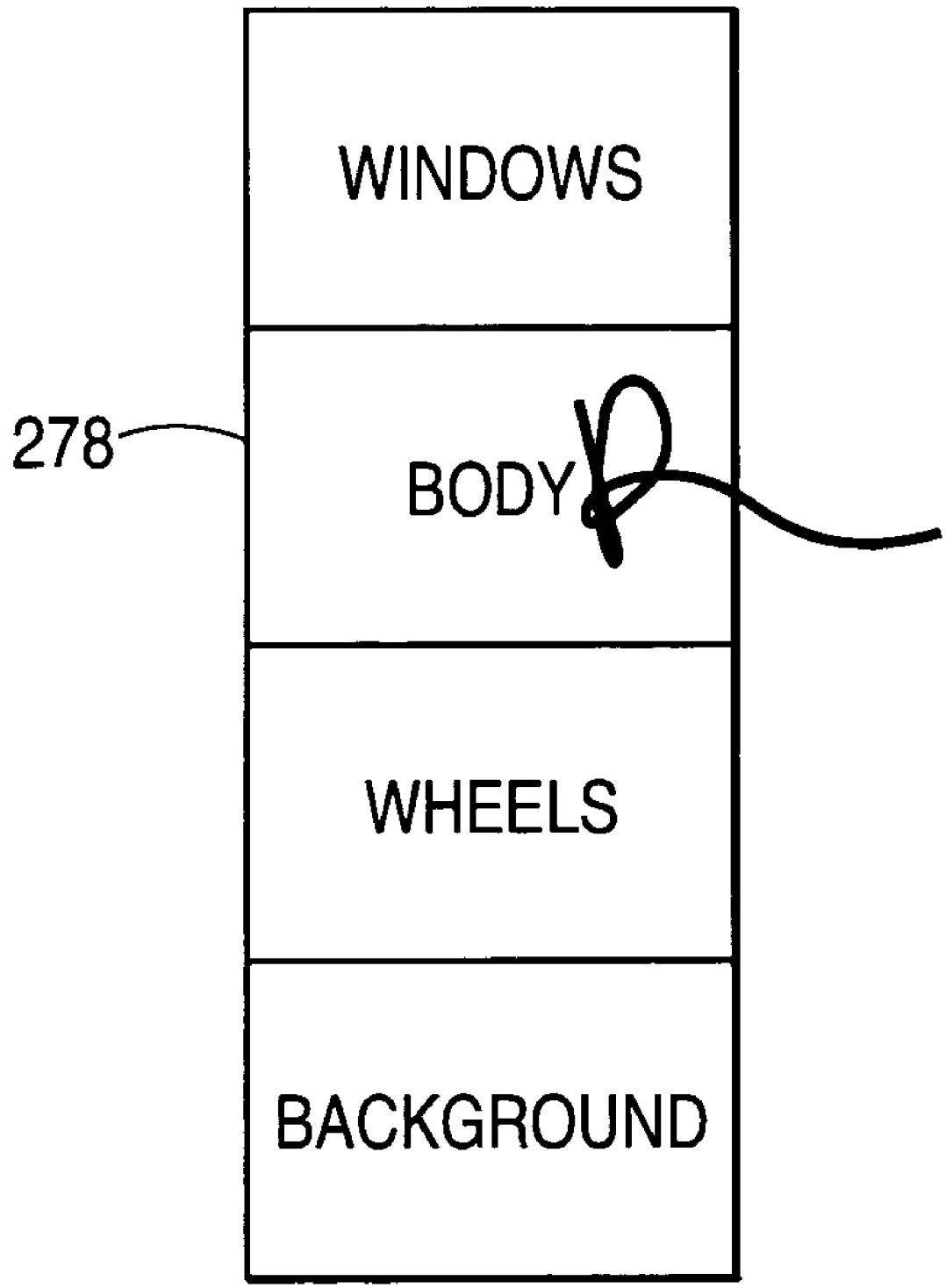
FIGS. 23-25 depict using gestures for layer editing.
Figure 24:
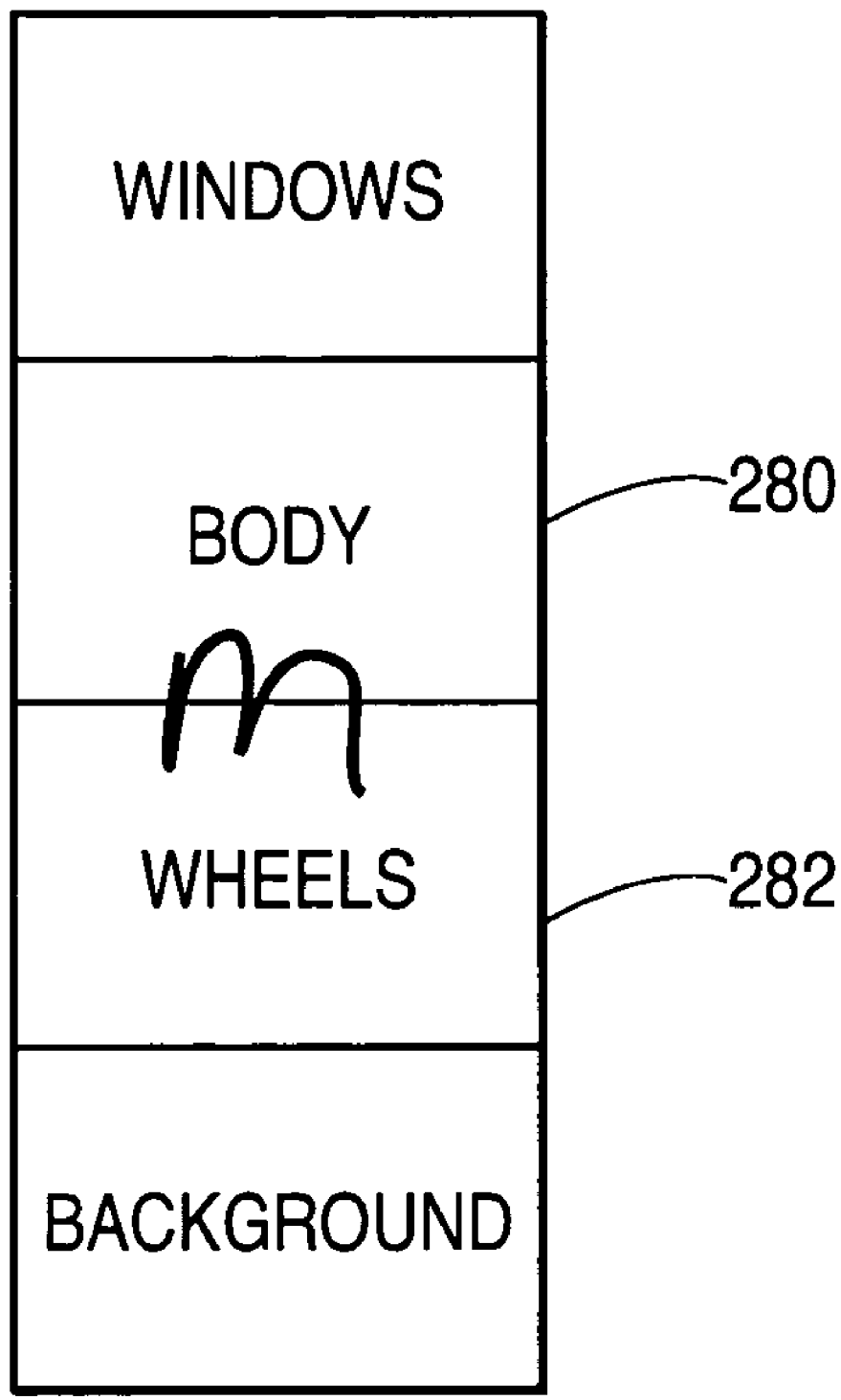
Figure 25:
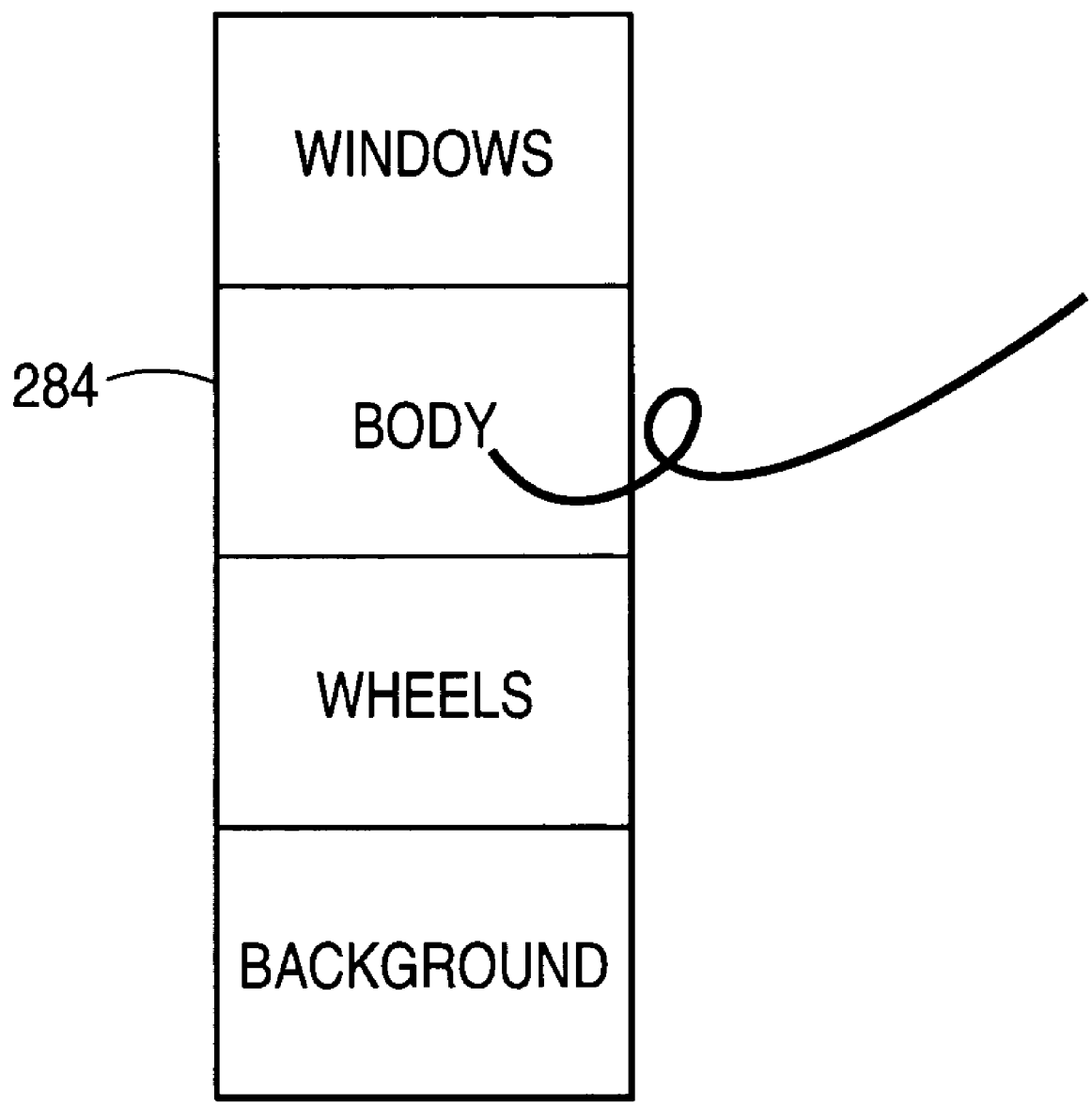
Figure 26:
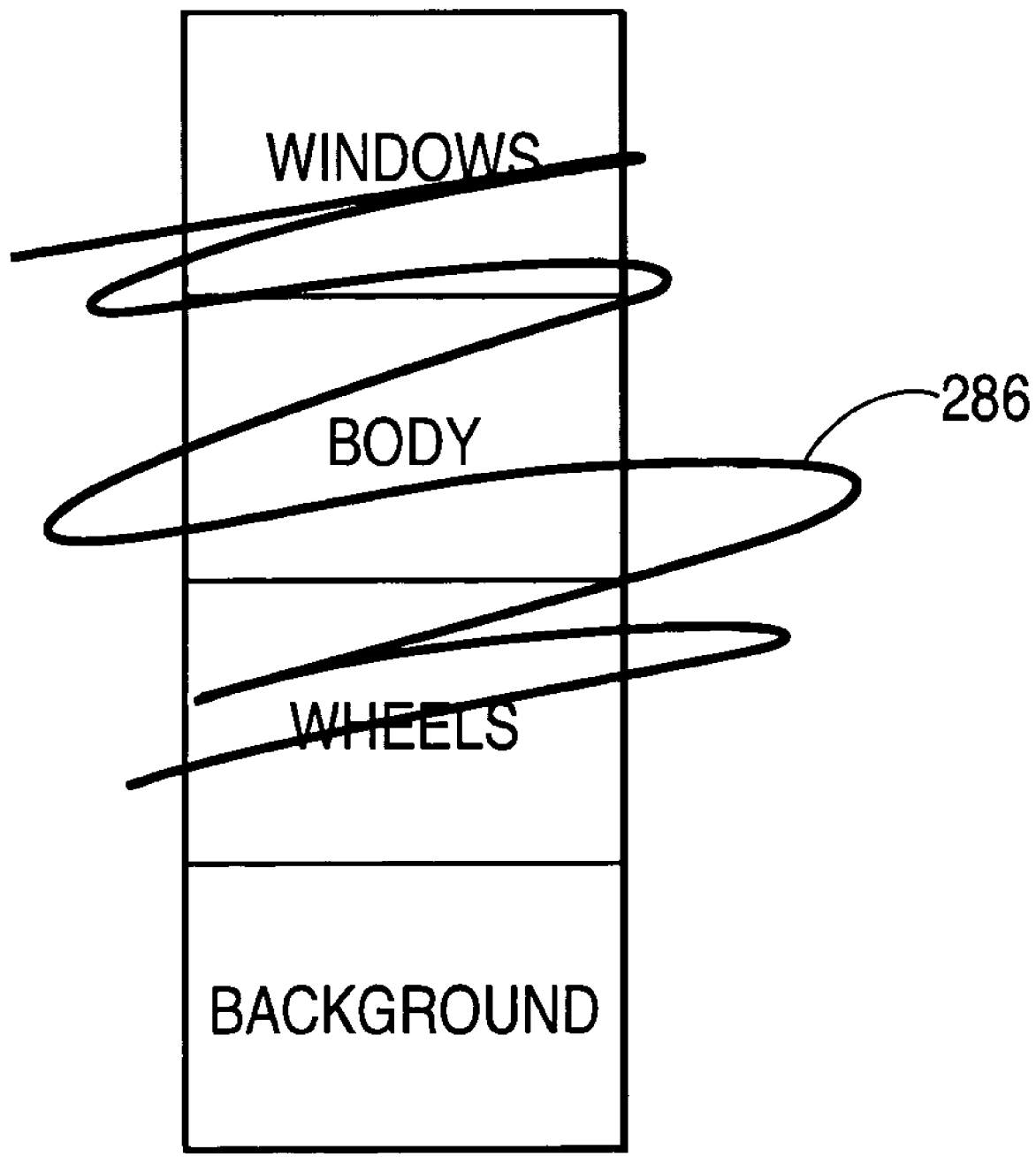

The user can also interact with the layer editor by using gestures and conventional gesture recognition and command invocation rather than menus. For example, as shown in FIG. 23, rather than popping up a menu on a layer and selecting the rename command to invoke the rename dialog, a user can invoke the "Rename" dialog by writing an "R" symbol over the intended layer 278. Gestures that span several layer boxes can also be use to specify several layer boxes simultaneously. For example, as shown in FIG. 24, the letter "M" drawn between two layer boxes 280 and 282 can be used to cause the system to merge the two layers into one layer. The gestures do not necessarily have to have "ink trails" which are the sequence of pixels activated when a pen stroke is made. Also, a gesture can span outside of a layer box, perhaps with some point (typically the starting point) in/on the layer control 284 as depicted in FIG. 25. A gesture could also be a scratch-out-mark 286 to indicate clearing or deleting of layers as shown in FIG. 26.

As can be seen from the above discussion, the present invention has several advantages. First, user identification of layers does not require text input. This is extremely important for a pen-based computer especially when no keyboard is available or keyboard or text entry is cumbersome. Second, commands can be applied to the various layers very quickly and easily using marking menu technology. Third, the invocation of the marking menus is facilitated by large "hit areas" for the menus.

The present invention can also be used with mouse or other I/O device systems.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A layer editor interface, comprising: a processor for displaying the layer editor interface: layer representation graphic having layer names inputable by a user and displayable as hand drawn strokes, and having selection targets with a box shape, each selection box comprising: a marking menu control activatable for each layer that allows the layer to be edited by hand drawn gestures where the marking menu control comprises edit controls for new layer, clear layer, rename layer, delete layer, merge layer, lock layer, hide layer and position layer; a re-order layers control; and a layer opacity control having a dialog box with a slider for setting layer opacity, wherein each of the controls has a target size of greater than 2e where e is a distance error accuracy of an input device, wherein an active layer is highlighted with a frame surrounding the name, wherein each layer graphic has an indicator indicating whether a corresponding drawing layer is visible, and wherein each layer graphic has an indicator indicating whether a corresponding drawing layer is locked.

2. A layer editor interface as recited in claim 1, further comprising a drawing dialog box invoked by the control and allowing the user to input the layer names.

3. A layer editor interface as recited in claim 1, wherein the control invokes a marking menu type layer editing menu.

4. A layer editor interface as recited in claim 1, wherein an active layer is highlighted with a frame surrounding the name.

5. A layer editor interface as recited in claim 1, wherein each layer control comprises: a marking menu control for layer editing; a move control for moving a position of a layer in a layer editor stack; and a transparency control controlling the transparency of a corresponding drawing layer.

6. A layer editor interface as recited in claim 1, wherein each layer graphic has an indicator indicating whether a corresponding drawing layer is hidden or visible.

7. An interface as recited in claim 1, wherein each layer graphic has an indicator indicating whether a corresponding drawing layer is one of hidden and locked.

8. A layer editor interface as recited in claim 1, wherein a background layer has a text label.

9. A layer editor interface as recited in claim 1, wherein activation of each control via a mark simultaneously selects a corresponding layer and selects an operation on the layer.

10. A layer editor interface as recited in claim 1, wherein making a marking gesture in association with the layer representation graphic initiates a function with respect to one or more of the layers.

\* \* \* \* \*

UNITED STATES PATENT AND TRADEMARK OFFICE
CERTIFICATE OF CORRECTION

| | | |
|---|---|---|
| PATENT NO. | : 7,895,536 B2 | Page 1 of 1 |
| APPLICATION NO. | : 10/748685 | |
| DATED | : February 22, 2011 | |
| INVENTOR(S) | : George Fitzmaurice et al. | |

It is certified that error appears in the above-identified patent and that said Letters Patent is hereby corrected as shown below:

Column 8, Line 35 in Claim 1, delete "interface:" and insert -- interface; --, therefor.

Column 8, Line 61 in Claim 5, delete "comprises:a" and insert -- comprises: a --, therefor.

Signed and Sealed this
Twelfth Day of July, 2011

David J. Kappos
*Director of the United States Patent and Trademark Office*